United States Patent Office 3,826,638
Patented July 30, 1974

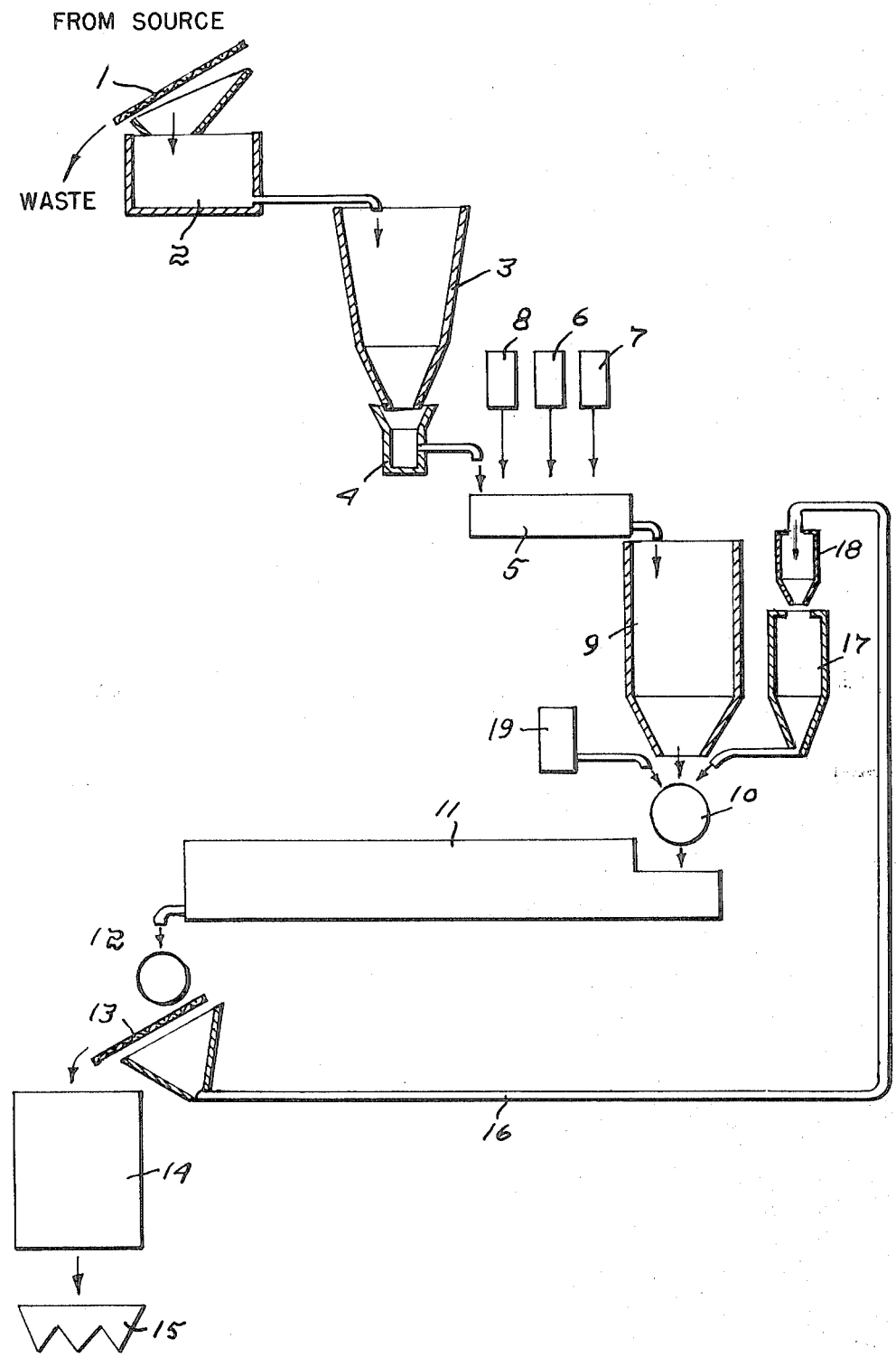

3,826,638
ORGANIC FERTILIZERS AND THEIR
PRODUCTION
Franklin A. Whitman, Benton, Maine
(R.F.D. 2, Waterville, Maine 04901)
Continuation-in-part of application Ser. No. 362,548, Sept. 15, 1972, which is a continuation-in-part of application Ser. No. 200, Jan. 2, 1970, both now abandoned. This application May 21, 1973, Ser. No. 362,548
Int. Cl. C05f 3/00
U.S. Cl. 71—21  19 Claims

ABSTRACT OF THE DISCLOSURE

An organic fertilizer and method of making the same is disclosed, the fertilizer being produced by mixing with wet manure at least .1% by weight of polyalkaline amine to that of the dry manure and at least the mole equivalent of an aldehyde. The product is then dried for a time and at a temperature such that the fertilizer is rendered sufficiently water insoluble to ensure that the available nitrogen is slowly released when the fertilizer is applied.

---

The present invention relates to substantially dry, manure base fertilizers having a controlled release of available nitrogen and is a continuation-in-part of Ser. No. 362,548, filed Sept. 15, 1972, now abandoned, which in turn was a continuation-in-part of Ser. No. 200, filed Jan. 2, 1970, now abandoned.

BACKGROUND OF THE INVENTION

Fertilizers of the so called N-P-K type are widely used with excellent results, particularly in the case of fast growing crops. They do, however, have the objectionable features that, since their nitrogen content is immediately available, not only must care be exercised that applications be in recommended amounts lest burning results but also plural applications may be necessary to ensure desired plant growth.

These factors have been recognized and fertilizers are produced that provide for the controlled release of the available nitrogen, the compounds being sometimes referred to as "slowly available nitrogen compounds" in contra-distinction from those used in the N-P-K type of fertilizers. Urea-formaldehyde condensates of the type called "ureaforms" have proved successful in attaining a desired slow release of available nitrogen. Such fertilizers have a relatively high per pound cost as compared with the N-P-K fertilizers.

These two types of fertilizers, considered separately or in combinations, are not ideal even though ensuring that a predetermined amount of available nitrogen is applied that is quickly available, as in the case of the N-P-K fertilizers, or slowly, as in the case of fertilizers providing for the controlled release of their nitrogen since they add nothing else to the soil than their contained chemicals. Fresh manures not only provide available nitrogen but also add useful organic matter and trace elements that are or become available as plant food over long periods and supply a wide range of chemicals important to plant growth and nutritional values.

Manures, however, are not ideal because they are not as easily applied as commercially produced fertilizers and because of uncertain and variable nitrogen content. Much of the available nitrogen of manure may have been lost before it can be applied to the ground. In addition, manures are not adapted to commercial use as fertilizers because of nuisance factors such as air and water pollution and, if dried, much of the available nitrogen is lost unless subjected to an acid treatment as disclosed in my application Ser. No. 779,429, filed Nov. 27, 1968 and now abandoned.

Different types of manures present different problems. On dairy farms, for example, cow manure is usually best utilized on adjacent fields. In the case of poultry, however, manure disposal is a serious problem, particularly in the case of so called "egg" farms which may house several hundred thousand birds. For that reason and because most other manures are not available in amounts or in condition necessary for commercial production, the invention is herein discussed with particular reference to fertilizers having a poultry manure base.

THE PRESENT INVENTION

The general objective of the present invention is to provide substantially dry, manure base fertilizers providing for a controlled release of its available nitrogen, the slowly available nitrogen compounds being the heat-treated reaction product of a wet mixture of manure, a polyalkaline amine, preferably polyethylenimine or polyethylene polyamine in an amount at least equal to .1% by weight to that of the manure if dry, and at least the mole equivalent of an aldehyde.

In production of such fertilizers the wet manure is ground, mixed and blended with the polyalkaline amine and the aldehyde which may be added to the wet manure in either order with the aldehyde serving both to cross-link the polyalkaline amine and to provide additional reactive sites with substantially all of the available nitrogen of the manure becoming linked to the reactive sites. The product is then dried and broken up into particles of desired size.

In practice, the original grinding of the manure ensures small but not necessarily uniformly sized particles. Substantially all of these particles are involved in the reaction and after drying, the available nitrogen is slowly available. After the product is dried, the mass is broken up into particles of desired size with the size being a factor in controlling the release of the available nitrogen.

Other objectives of the invention are concerned with the tailoring of the mixture to ensure that the fertilizer has the desired N-P-K composition. As above noted, even with fresh manure, some nitrogen loss is experienced in its handling before it can be processed. In addition, the N-P-K composition of manures from one source may differ from that collected from another source.

In the single figure of the accompanying drawing, apparatus for carrying out the process is schematically illustrated.

The invention is detailed in connection with the processing of wet hen manure by which is meant an aqueous manure mixture that will flow and that can be pumped. Wet manure is available at egg farms but obviously any manure can be readily brought to the right consistency for processing.

The wet hen manure is first passed through a coarse screen 1 into a surge tank 2, an operation necessary only because manure from the source or sources may contain large objects, dead hens, for example, that might damage the equipment or interfere with the process. In practice, a screen having a two inch mesh has been effective in removing all destructive foreign material.

The screened manure flows from the surge tank 2 to a feed hopper 3 which provides a head adequate to effect a force feed of the manure into and through a grinder 4 where remaining foreign matter such as feathers and egg shells as well as the manure is processed as to ensure that particle sizes in the ground manure do not exceed a maximum particle size. In practice, the grinder 4 is of a type continuously shearing and cutting the product and having a hydraulic discharge, grinders available from the Griffith Laboratories, Inc. of Chicago, Ill., with a 3 mm. plate have proved satisfactory in use.

The outfeed from the grinder 4 is in communication with a blending and mixing mill 5 for blending additives. The solution of the selected polyalkaline amine is delivered into the mill 5 through the supply 6 and the water solution of an aldehyde, preferably formaldehyde, is delivered thereto by means of the supply 7. While either the polyalkaline amine solution or the aldehyde solution may be delivered into the blender 5 ahead of the other, it is preferred that the polyalkaline amine be first introduced. A urea supply 8 is also placed in communication with the blender 5 ahead of the supply 6 but is not normally used unless the available nitrogen of the manure is below the desired level.

The blended mixture is discharged from the mill 5 into a hopper 9 feeding the extruder 10 which prepares and delivers the product to the conveyor of the dryer 11 from which a dry or substantially dry sheets and cakes are discharged and broken up by a breaker 12 and delivered against a screen 13 with larger sized particles delivered to a storage bin 14 which may be serviced by a bagger 15. In practice, screens 13 of a three-eighths inch mesh are satisfactory. Undersized particles are delivered through a conduit 16 to a feed hopper 17 by means of a cyclone collector 18. The outlet of the feed hopper 17 being in communication with the intake side of the extruder 10 as is a supply 19 for an acid solution, desirably phosphoric acid.

In practice, the water soluble polyalkaline amine is introduced into the mill 5 in an amount equal to at least .1% by weight of the polyalkaline amine to that of the dry manure and the mole equivalent of an aldehyde is used, the aldehyde preferably being formaldehyde. Any amount of polyalkaline amine in excess of the above indicated minimum may be used since it is, by itself, an excellent nitrogen source but its present cost makes more than 2% undersirable with about .4% being the preferred amount. In practice, polyethylenimine or polyethylene polyamine are used in the form of a 5% aqueous solution with a pH value of about 10.0. The molecular weight of the polyalkaline amine used was in the 40,000, to 60,000 range. Higher molecular polyalkaline amines may be used but less advantageously because of their viscosity. Polyalkaline amines of a lower molecular weight can be used.

It is preferred that the manure be passed through the grinder 4 before the polyalkaline amine is added thereto because the grinding step would otherwise tend to degrade some of the polyalkaline amine molecules and make them less effective.

While the mixture reacts when blended, it is as a consequence of the drying step that the compounds become water insoluble to the desired extent. The higher the drying temperature, the shorter the drying time and the drier the product, the greater the degree of water insolubility. Maximum water insolubility is attained with a product dried at the highest possible drying temperature and with a moisture content of substantially .0%. In practice, the product is dried with an air temperature in the neighborhood of 300° F. Temperatures in the order of 250° F. are acceptable except that the time required for drying is objectionably long and the product is more soluble and temperatures much above 300° F., say 325° F., will result in charring with a consequent loss of nitrogen.

It will thus be apparent that the invention makes possible a dry fertilizer providing for the slow release of the available nitrogen with the rate of release being determined by the drying temperature and by the extent to which the particles of the product are agglomerated.

Because of the variation in the chemical content of manures received for processing, the addition of phosphoric acid may be necessary or desirable and this is preferably effected by means of the supply 19 in communication with the intake side of the extruder 10, delivery at this point minimizing the extent to which equipment must be protected against acid attack and the extruder serves as an effective blender for this additive.

When the available nitrogen content is too low, correction is effected by the addition of urea through the supply 8 at the infeed end of the mill 5. The urea reacts with the formaldehyde to form a ureaform but care must be taken to keep the amount of formaldehyde that is available to react with the urea in the range of from 1 to 1.25–1.4, the ratio being the mole ratio. The mole ratio between the aldehyde and the PEI must, accordingly be changed from that originally set forth. In addition, phosphoric or some other acid must be added.

From the foregoing, it will be apparent that the invention makes possible fertilizers more nearly approaching the ideal than other fertilizers as it combines the advantages of slow release of its available nitrogen with that of its organic matter. The pH of the product can be adjusted to any desired value consistent with the stability of the product. In addition, it is free of objectionable odor and enables a troublesome source of air and water pollution to be reduced to a minimum. For the ureaforms to be classed as fertilizer thus must contain at least 35% nitrogen in a slowly available form and test at least 40% by the nitrogen activity index defined as $$\frac{\text{Percent CWIN} - \text{Percent HWIN} \times 100}{\text{Percent CWIN}}$$

with CWIN being the percentage of nitrogen soluble in cold water 25° C. and HWIN being the percentage of nitrogen insoluble in water in the 98°–100° C. range.

A fertilizer in accordance with the invention may have its nitrogen activity index selected within a wide range by controlling the time and temperature of the curing step, by control of the final particle size, or both. While for some purposes it may be desired to have available nitrogen of fertilizer applied in one season become available during the next season, for other purposes it may be desired to have its release so controlled as to prevent burning or to avoid the necessity of successive applications during a single growing season.

I claim:

1. The method of preparing fertilizer from manure that comprises mixing with wet manure, separately or independently of the order, polyalkaline amine in an amount at least equal to .1% by weight of the polyalkaline amine to that of dry manure, and at least the mole equivalent of an aldehyde, and then drying the product for a time and at a temperature such as to render the reaction products of the polyalkaline amine and the aldehyde and the available nitrogen of the manure now linked thereto sufficiently water insoluble to prolong substantially the length of time during which the potentially available nitrogen thereof is continuously made available when the fertilizer is applied.

2. The method of claim 1 in which the wet manure is that of poultry.

3. The method of claim 1 in which the drying is effected with the temperature in the approximate range of from 250°–310° F.

4. The method of claim 1 in which the drying is effected at a temperature in the neighborhood of 300° F.

5. The method of claim 1 in which the fertilizer is in the form of cakes at the end of the drying step and the additional step of breaking up the cakes to an extent such that the particle size of the fertilizer is greater than that of the manure at the time it is mixed with the polyalkaline amine and the aldehyde.

6. The method of claim 1 in which the manure is ground prior to its being mixed with the polyalkaline amine and the aldehyde.

7. The method of claim 1 in which the molecular weight of the polyalkaline amine is at least 20,000.

8. The method of claim 1 in which phosphoric acid in amounts in the range of 1–4% by weight of the manure is added just prior to the drying step.

9. The method of claim 1 in which urea is added to the wet manure prior to the additions thereto of either the polyalkaline amine or the aldehyde and sufficient additional aldehyde is added to react therewith to form a ureaform.

10. The method of claim 5 in which particles formed during the breaking up of the cakes that are smaller than those wanted for the fertilizer are returned and mixed with the product between the first mixing step and the drying step.

11. The method of claim 1 in which the polyalkaline amine is P.E.I.

12. The method of claim 1 in which the polyalkaline amine is polyethylene polyamine.

13. A substantially dry fertilizer comprising the heat cured reaction product of a wet mixture of manure, polyalkaline amine in an amount equal to at least .1% by weight of the wet manure, and the mole equivalent of an aldehyde, the reaction product being in the form of particles, each characterized by its having available nitrogen of the manure linked thereto and by its being sufficiently water insoluble to prolong substantially the length of time during which the potentially available nitrogen of the product is continuously made available when the fertilizer is applied.

14. The fertilizer of claim 13 in which the manure is poultry manure.

15. The fertilizer of claim 13 in which the particles are present as agglomerates.

16. The fertilizer of claim 13 in which the fertilizer also includes ureaform.

17. The fertilizer of claim 16 in which the fertilizer also includes phosphoric acid.

18. The fertilizer of claim 13 in which the polyalkaline amine is P.E.I.

19. The fertilizer of claim 13 in which the polyalkaline amine is polyethylene polyamine.

References Cited
UNITED STATES PATENTS

| | | | |
|---|---|---|---|
| 2,754,815 | 5/1956 | Mussell | 71—27 X |
| 2,842,534 | 7/1958 | Doughty | 71—27 X |
| 3,073,693 | 1/1963 | Nielsson et al. | 71—29 X |
| 3,050,383 | 8/1962 | Wilson | 71—64 D X |

CHARLES N. HART, Primary Examiner

R. BARNES, Assistant Examiner

U.S. Cl. X.R.

71—27, 28